United States Patent [19]

Couderc et al.

[11] Patent Number: 4,686,803

[45] Date of Patent: Aug. 18, 1987

[54] CLADDING ELEMENT FOR OUTER FACADES, AND APPLICATION THEREOF

[75] Inventors: Pierre Couderc, Neuilly sur Seine; Henri Corbel, Saint Brevin, both of France

[73] Assignee: Elf Isolation, Paris, France

[21] Appl. No.: 677,545

[22] PCT Filed: Feb. 27, 1984

[86] PCT No.: PCT/FR84/00040

§ 371 Date: Oct. 29, 1984

§ 102(e) Date: Oct. 29, 1984

[87] PCT Pub. No.: WO84/03320

PCT Pub. Date: Aug. 30, 1984

[30] Foreign Application Priority Data

Feb. 28, 1983 [FR] France ............... 83 03228

[51] Int. Cl.⁴ .............. E04D 3/368; E04D 13/16; E04B 1/70

[52] U.S. Cl. ........................... 52/97; 52/520; 52/522; 52/533; 52/543

[58] Field of Search ......... 52/520, 522, 530, 531, 52/97, 276 539, 440, 543, 281, 282, 533, 145, 97, 779

[56] References Cited

U.S. PATENT DOCUMENTS

| | | | |
|---|---|---|---|
| 1,882,529 | 10/1932 | Thulin | 52/440 |
| 1,998,425 | 4/1935 | McNeil | 52/145 |
| 2,209,283 | 7/1940 | Ronzone | 52/539 |
| 3,001,332 | 9/1961 | Wilder | 52/531 |
| 3,214,876 | 11/1965 | Mattes | 52/520 |
| 3,233,382 | 2/1966 | Gravely | 52/522 |
| 3,969,866 | 7/1976 | Kyne | 52/522 |
| 4,055,916 | 11/1977 | Yamamoto et al. | 52/97 |
| 4,327,528 | 5/1982 | Fritz | 52/533 |
| 4,454,863 | 6/1984 | Brown et al. | 52/533 |

FOREIGN PATENT DOCUMENTS

| | | | |
|---|---|---|---|
| 202340 | 2/1955 | Australia | 52/461 |
| 323964 | 10/1974 | Austria . | |
| 531202 | 9/1954 | Belgium | 52/276 |
| 688529 | 3/1967 | Belgium . | |
| 688713 | 6/1964 | Canada | 52/531 |
| 1900258 | 9/1969 | Fed. Rep. of Germany | 52/97 |
| 2447489 | 8/1978 | Fed. Rep. of Germany | 52/531 |
| 2900583 | 7/1980 | Fed. Rep. of Germany . | |
| 1375800 | 9/1964 | France | 52/97 |
| 1599637 | 8/1970 | France . | |
| 1073703 | 6/1967 | United Kingdom | 52/779 |

Primary Examiner—James L. Ridgill, Jr.
Attorney, Agent, or Firm—Weiser & Stapler

[57] ABSTRACT

A wall is provided with an outer facade comprised of a cladding element which contains an insulating core. The cladding element includes a central band having flanges extending from opposing edges, on the same side of the plane defined by the central band. Each of the flanges includes a row of venting holes and a ratchet blade protruding from the flange and adapted for interlocking connection with the ratchet blade of a corresponding, adjacent cladding element. The insulating core is made from a rigid insulating material and includes a series of embossed blocks distributed evenly over its outer surface so that the inner surface of the central band rests on the embossed blocks of the insulating core. Also provided are a number of mounting and finishing elements including end and intermediate rails for enclosing the flanges of the cladding element, as well as special coverings for cable edges and salient or re-entrant angles.

35 Claims, 6 Drawing Figures

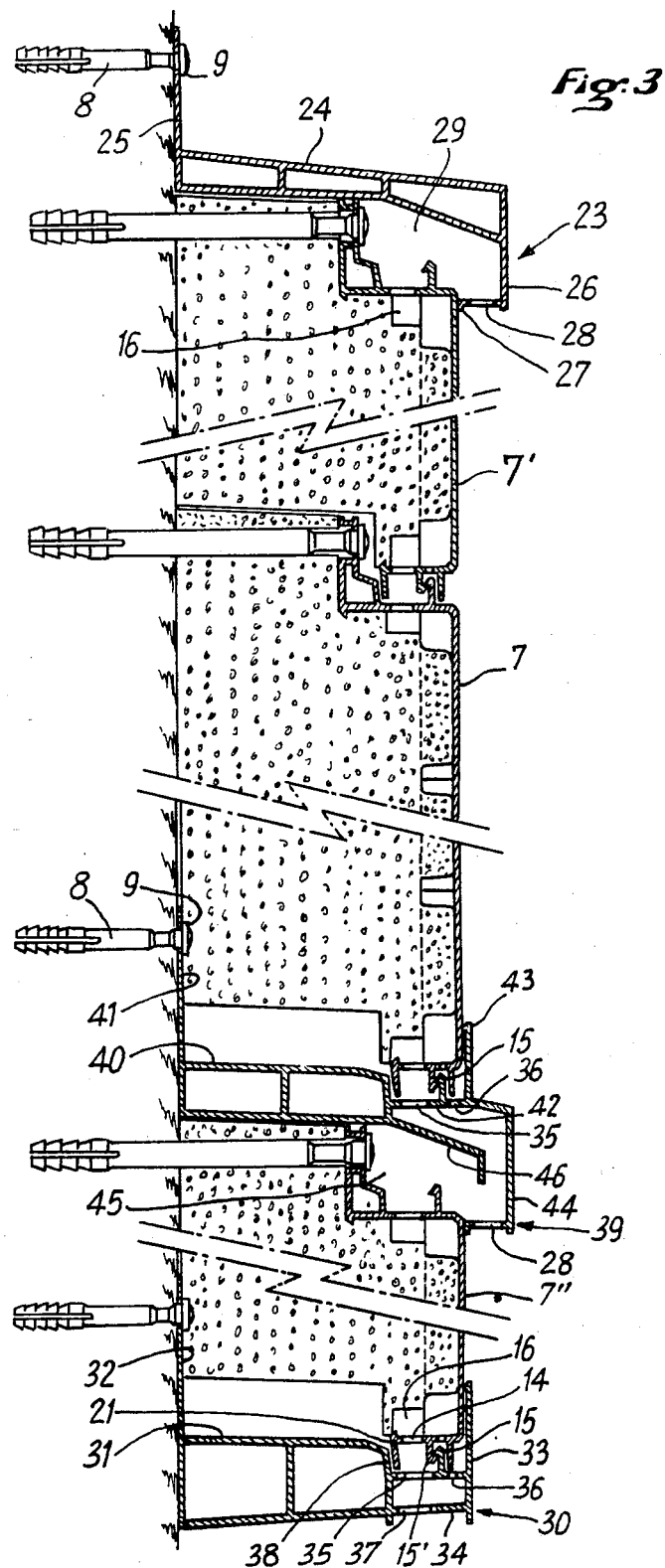

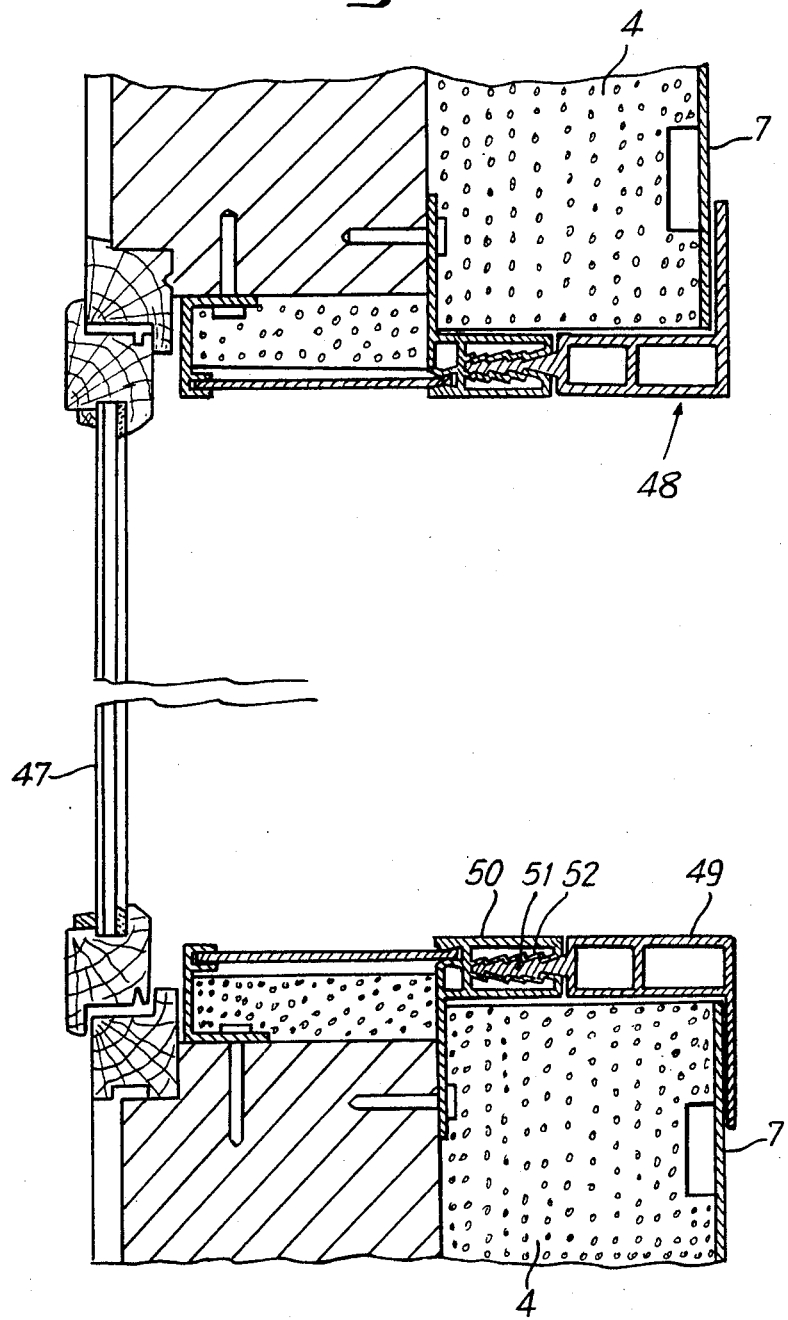

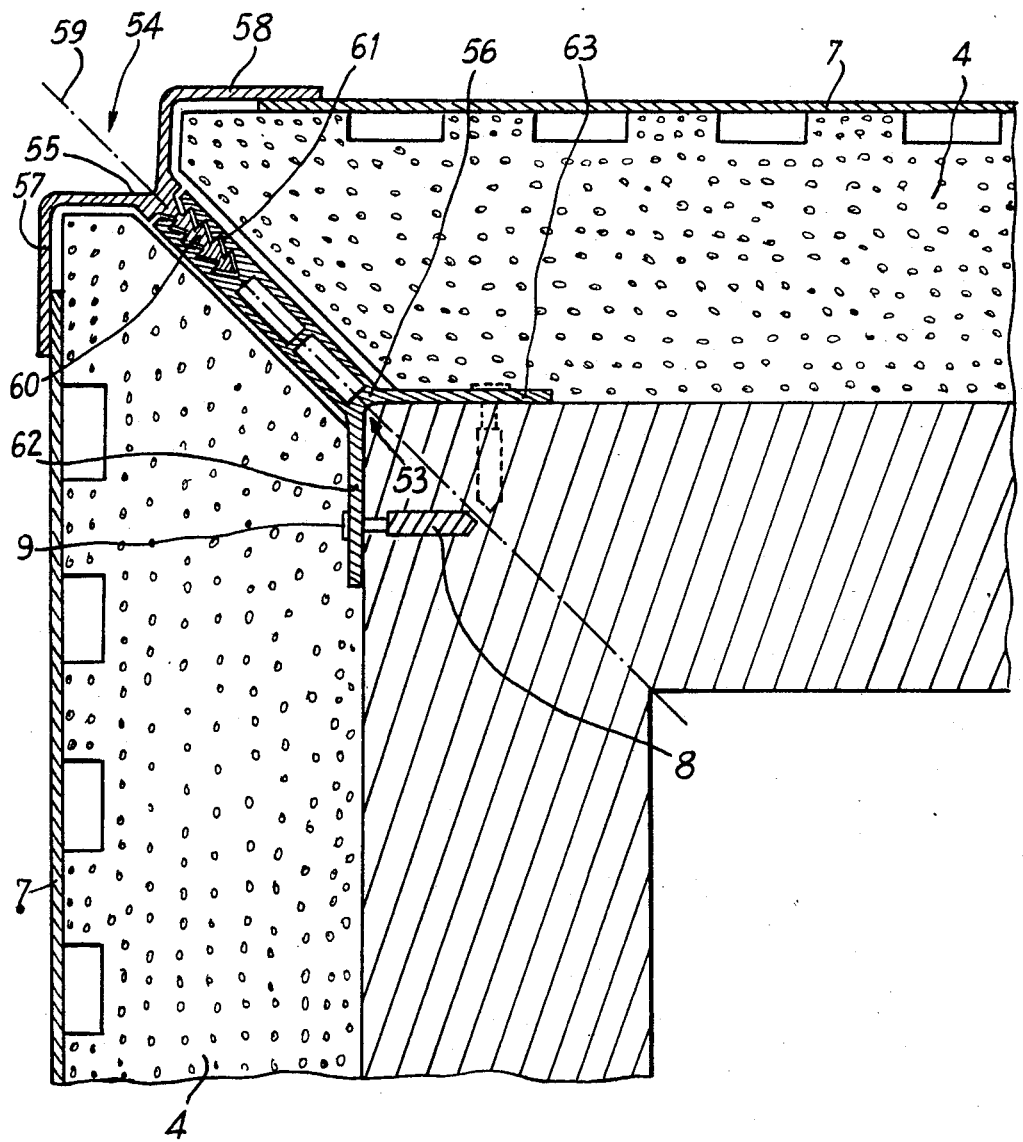

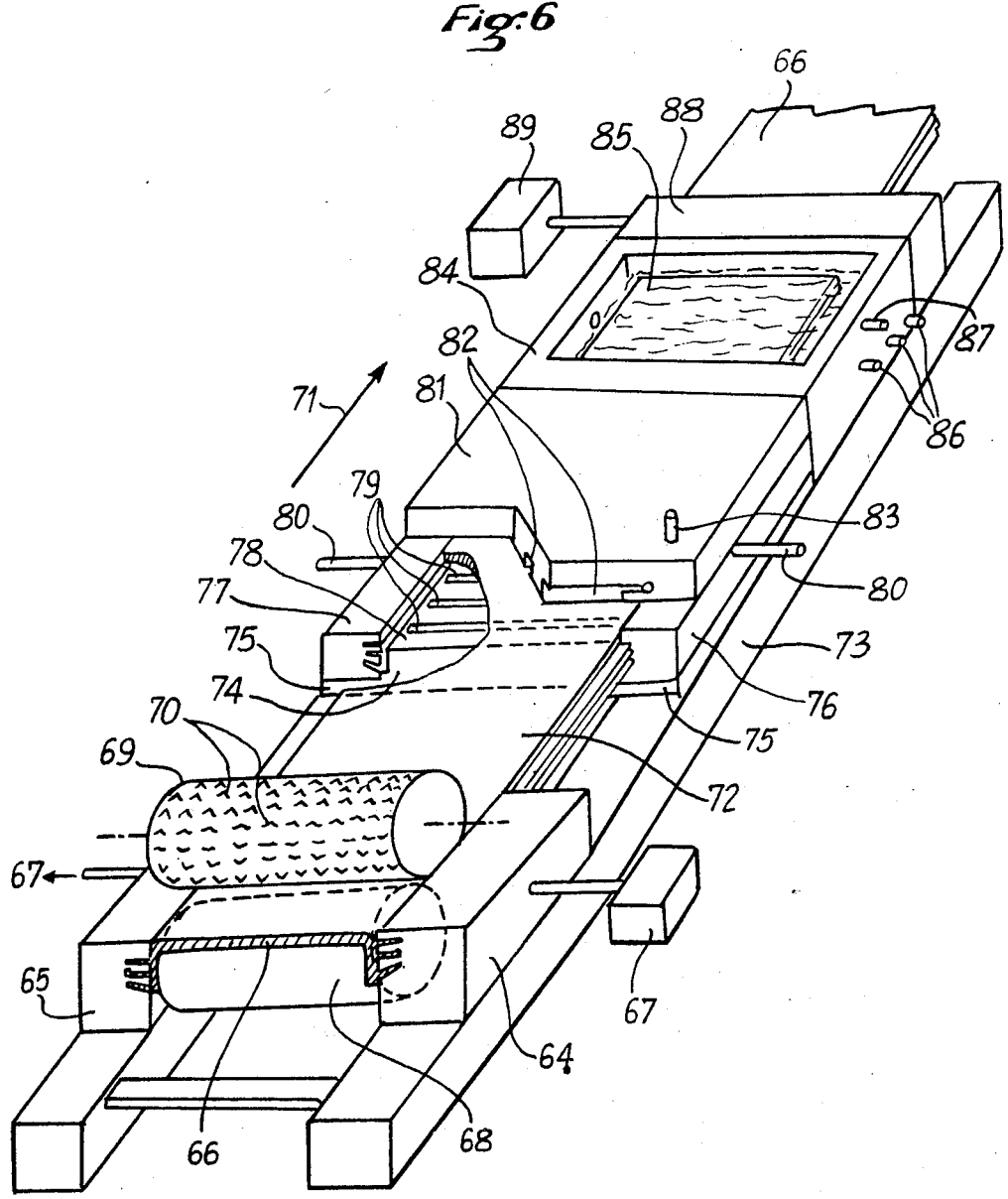

CLADDING ELEMENT FOR OUTER FACADES, AND APPLICATION THEREOF

The present invention pertains to a cladding element for outer facades of buildings and to the application thereof for cladding the said facades. It also pertains to an embossing apparatus for cladding elements, especially when they are used for siding panels.

The outer heat insulating systems are insulation systems in which the insulating material is disposed on the outer facade of the outer walls of a building, i.e., on the outer concrete or masonry walls.

Insulating cladding is in an increasingly important place among the outer heat insulating systems currently used.

It should be recalled that an insulating cladding is an outer cladding formed by the assembly of prefabricated units which combine an insulating material and an outer shell, the said units being glued and/or attached mechanically to the support wall.

In the Austrian Pat. No. 323,964 there is described a cladding formed by complex elements each comprising a core consisting of insulating material, incorporated in an outer shell formed by a panel consisting of a section made of a thermoplastic material. On its face in contact with the panel the core made of insulating material has embossed parts forming spacers for a narrow air gap. The panel consists of a flat central band edged on each lateral side by a flange. One of the said flanges is extended by a folded-back part directed toward the inside of the panel and is practically parallel to the central band in such a way as to form a hook whereas the other edge is extended by a wing directed towards the outside of the panel and is practically parallel to the central band. The said wing is provided with holes for fixing screws for attaching the panel to the support, and it also has, at its end, a folded-back part disposed on the side of the central band is practically parallel to the latter, the said folded-back part forming a hook complementary to that formed by the part forming the extension of the other flange of the panel. The connection between the two adjacent panels is achieved by engagement of the folded-back part forming an extension of one of the flanges of the panel with the part folded back in a complementary fashion on the end of the wing of the adjacent panel.

A primary inconvenience of this type of cladding lies in the fact that the connection means of the panels do not permit interlocking of the panels with each other, which involves the risk of unhooking of downward stress due to wind.

A second inconvenience arises from the fact that no means are provided for evacuating the condensation products, and that, even though there is aeration between the insulating core and the panel due to the narrow air gap provided by the embossed parts, it is nonetheless true that the ventilation or the renewal of the air is not satisfactory.

A third inconvenience lies in the fact that the fixing heads of the panels on the support are not protected from bad weather.

Finally, a fourth inconvenience arises from the difficulty of placing the cladding elements, e.g., in the vertical U-shaped fastening squares around openings such as windows and doors.

The present invention has the task of eliminating these inconveniences and to propose a cladding element that is suitable for use as a panel for a cladding that can be attached to the support wall both horizontally and vertically.

It also pertains to a means permitting the placement and fixation of the cladding elements on the support walls enclosing a re-entrant or salient angle with other support walls without the appearance of discontinuities. The means according to the present invention also permit the connection of parts of the cladding at the openings as may be present in the support wall.

Finally, it also pertains to a panel embossing apparatus which confers an outer embossed appearance, e.g., a conventional painted appearance, to the said panel.

To achieve this, the cladding element according to the present invention, which is made by extrusion from a thermoplastic material, particularly polyvinyl chloride, and which comprises a central band edged on both sides by a flange as well as connection means able to permit a connection between the adjacent cladding elements, is characterized in that the said connection means are disposed on each of the flanges and consist of at least one ratchet blade cooperating with a ratchet blade of the adjacent elements which must be connected with the said element.

Each of the flanges of the cladding element is provided with at least one row of holes. In particular, one of the flanges comprises two rows of holes arranged in such a way that the ratchet blade present on this flange is disposed between the two rows of holes. In this embodiment the other flange comprises preferably a single hole, while the ratchet blade provided on this flange is disposed between the hole of rows and the plane of the central band of the element and has a form complementary to the ratchet blade on the flange having two rows of holes.

The cladding according to the present invention is characterized in that the insulating core comprises square blocks disposed in a quarrel pattern, a panel formed by the cladding element according to the present invention, as defined, in particular, in the claims, and, in this case, aerating channels are preferably provided in the insulating core and are disposed in such a way as to be at least partly opposite the aerating holes of the panel and to thus permit the communication between the said holes and the space between the blocks.

The embossing apparatus for a section suitable for use as a panel according to the present invention is characterized in that it comprises at least embossing means disposed at the outlet of the extrusion means used for extruding the said section, the said embossing means being formed by a counterroller mounted free on an axis of rotation and supporting the said section at the outlet of the extrusion means, an embossing roller mounted above the central band of the section, the said embossing roller being driven at a linear speed equalling the speed of travel of the said section over the said counterroller, and principal shaping means disposed on the side of the lateral flange or flanges of the said section, the said shaping means being connected to a vacuum source in such a way that the flange or flanges of the section are cooled and maintained practically in their shape at the outlet of the extrusion means.

Other advantages and characteristics of the present invention will become apparent from the following description of an embodiment of the present invention, given as an indicative rather than limiting example, with reference to the attached drawing, in which:

FIG. 3 is a vertical section of a support wall clad with a cladding, and comprises end rails as well as an intermediate connection piece;

FIG. 4 is a section at an opening provided in the support wall for a frame angle;

FIG. 5 is a section of a salient angle of the support wall with connecting means of the cladding disposed on the two sides of the angle;

FIG. 6 is a partial exploded schematic view of the embossing apparatus according to the present invention.

Figure 1:
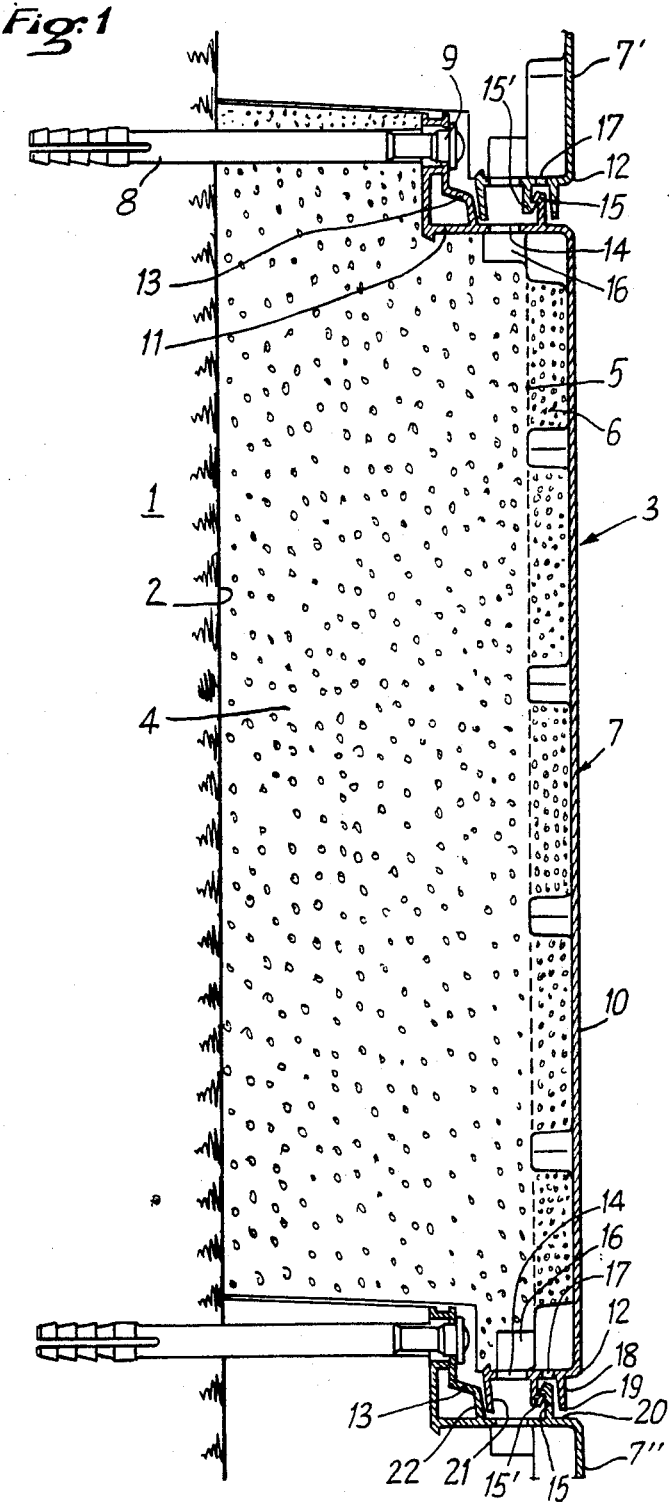
FIG. 1 is a vertical section of a cladding element according to the present invention.

The outer heat insulation of a support wall 1 of a building is ensured by attaching cladding elements analogous to the cladding element designated by the reference numeral 3 in its entirety, as indicated in FIG. 1, on the outer facade 2.

Figure 2:
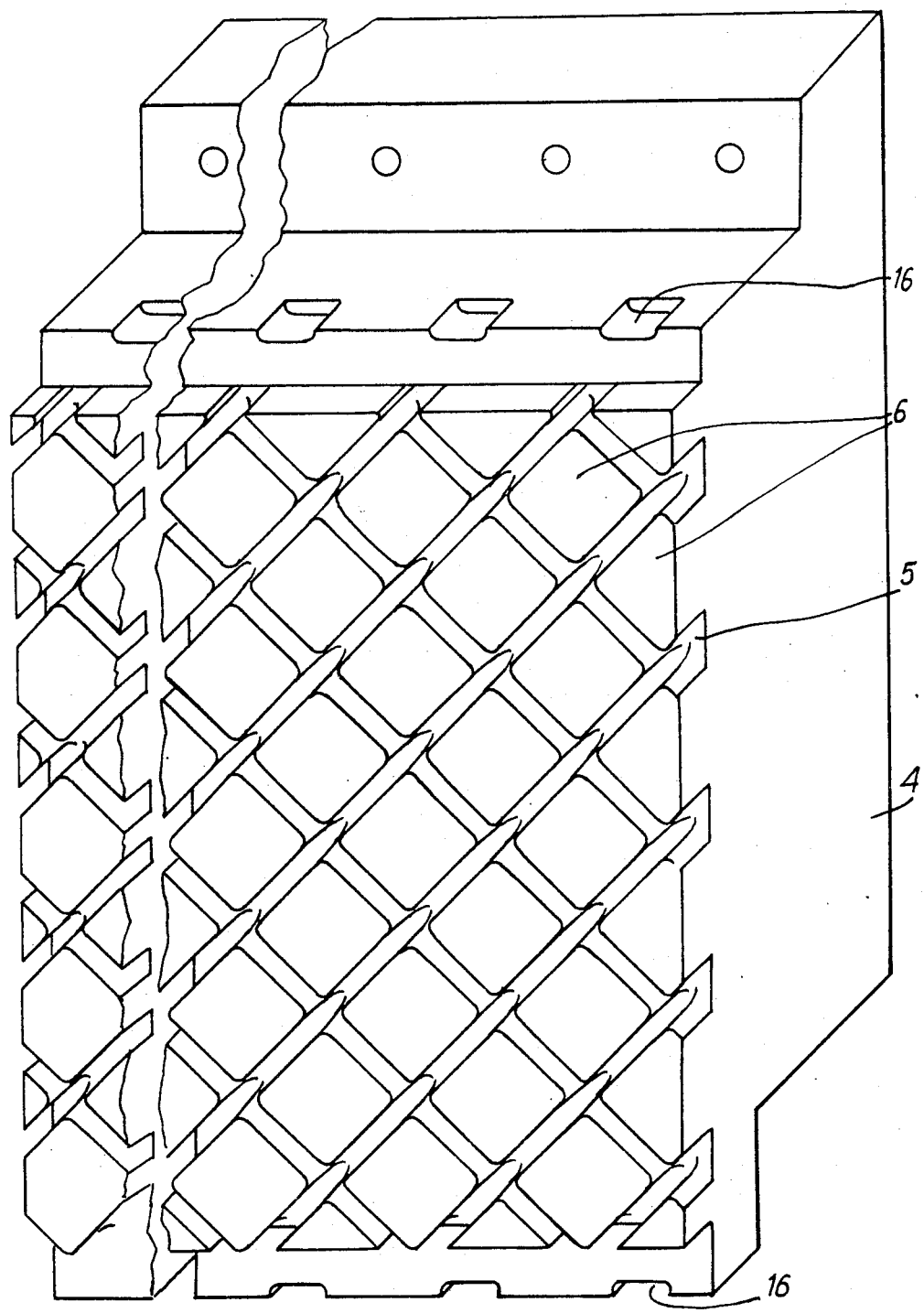
FIG. 2 is an exploded view of the insulating core of the cladding element.

The cladding element 3 comprises an insulating core 4, or incorporated insulating material, consisting of a rigid insulating material such as molded polystyrene foam having a density of between 16 and 18 kg/m$^3$ in particular, which is preferably rendered fire-resisting, whose outer face 5 is provided with square blocks 6 disposed in a diagonal or quarrel pattern (FIG. 2). The useful thickness of the insulation is, e.g., between 60 and 120 mm. The blocks 6 have rounded edges, with a thickness of 10 mm, forming consequently shims with a thickness of 10 mm.

The insulation 4 is incorporated in a cladding element forming a panel 7, the assembly formed by the insulation 4 and the panel 7 being attached to the support wall 1 by fixing elements each comprising a nylon expansion bolt 8 and a notched nail 9. In a preferred embodiment of the present invention three insulation blocks 4 are incorporated in each panel 7 having a useful width of ca. 300 mm for a length on the order of magnitude of 3,500 mm.

The panel 7 is a section prepared by extrusion of a thermoplastic material, such as polyvinyl chloride, in an extruder (not shown), and is in the form of a central band 10 edged on both sides by a flange or edge 11, 12. In FIG. 1 the edges 11 and 12 are designated as being the upper and lower edges, respectively, but it is obvious that when the cladding element 3 is disposed vertically rather than horizontally, they will be the left and/or right edges, depending on the direction from which they are viewed. The upper edge 11 comprises a reinforcing rib 13 across which are introduced the complete fixing means 8, 9, the vent holes 14 and the hooking means being formed by an upper ratchet blade 15. The vent holes 14 are oblong, having a dimension of, e.g., 8×32 mm, and are distributed uniformly throughout the length of the edge 11, spaced at, e.g., 50 mm from each other (spaces between the axes). The holes 14 are provided on the edge 11 in such a way that they are opposite the vent channels 16 provided in the insulation 4. The channels 16 are preferably larger than the holes 14, e.g., 20×40 mm, so that there is always a communication between the channels 16 and the holes 14 when the said insulation 4 is incorporated in the panel 7. The lower edge 12 also comprises vent holes 14 opposite the aerating channels 16 in the insulation, a lower ratchet blade 15', and the holes 17 for evacuating the condensation products or condensed water. The blade 15' is disposed between the holes 14 and 17 in such a way that when the blades 15 and 15' are caught between them the condensed water is prevented from entering the aerating channels 16 of the insulation 4. The condensed water is guided and evacuated to the outside by a small tongue 18 formed by extrusion, whose height is such that when two adjacent panels 7 and 7' or 7" are connected to each other, the free lower border 19 of the small tongue does not come to rest on the adjacent edge and a passage 20 is left between the said border 19 and the said adjacent edge. The condensed water accumulated in the space between the blades 15 and 15' which are caught and hence locked, and the small tongue 18 flows across the passage 20 and trickles over the outer face of the central band 10. A stop 21, which is also extruded, is provided on the lower edge 12, the said stop 21 being able to rest on a catch 22 formed by part of the reinforcing rib 13. The stop 21 and the catch 22 are preferably slightly oblique in such a way as to improve the contact between them. The organs 21 and 22 serve the purpose of limiting a possible relative displacement between two adjacent assembled panels, the organ 21 serving also as a guide during the placement of the panel. If the blades 15 and 15' have inclined support surfaces, it is possible to eliminate the stop 21.

To form a cladding permitting the thermal insulation of the entire facade of a support wall from the outside always necessitates the utilization of several cladding elements identical to those shown in FIG. 1, the said cladding elements being attached separately to the support wall particularly by means of complete fixing elements 8, 9, and connected to each other by the ratchet blades 15 and 15'. A lower rail is installed first and serves as a reference for the cladding, after which the cladding elements are mounted and when the last cladding element has been attached, the cladding of the facade is terminated with an upper rail in such a way as to complete the protection of the cladding.

According to the present invention (FIG. 3) the upper or top rail 23 is made of an extruded thermoplastic material, such as polyvinyl chloride, and it is formed by a central hollow rib 24 and two flanges 25 and 26. The flange 25 is directed upward and is attached to the support wall 1 by means of appropriate fixing elements, and particularly by means of complete fixing elements 8, 9. The flange 26 is directed downward, i.e., in a direction opposite to that of the flange 25, and it comprises a border 27 perforated with oblong openings which rests on the central band of the upper panel. Due to the fact that the top rail 23 covers slightly the said last panel, the protection and aeration of the said last upper cladding element 3 is ensured, the ventilation taking place via the channels 10, the inner space 29 of the rail 23 and across the holes 28.

The lower or bottom rail 30 is also made of extruded thermoplastic material, and particularly of polyvinyl chloride, and it is formed by a central reinforcing rib 31 and two flanges 32 and 33 directed in the same direction. The flange 32 is attached to the support wall 1 by fixing elements and particularly by the complete fixing elements 8, 9, whereas the flange 33, which is slightly elastic, is supported on the central band of the lower first panel. A ratchet blade 15 cooperating with the ratchet blade 15' of the adjacent panel is provided on a thinner part 34 of the central rib 31, along with the vent holes 35 and the evacuating holes 36 for the condensed water, the ventilation and evacuation taking place via the holes 37. The central rib 31 also comprises a free border 38 forming a catch for the stop 21 of the adjacent panel.

For positioning the cladding elements 3 vertically or for change between horizontal and vertical positions, or to achieve a supplementary relief effect in the case of horizontal mounted, and finally to stagger the panels, which may have been cut, relative to openings in the support wall 1, the present invention provides an original solution to these problems by the use of an intermediate piece 39 as shown in FIG. 3.

The intermediate piece 39 is the combination of the top rail 23 and of the bottom rail 30, and consequently it plays the role of the lower rail of the said piece 39 for the adjacent panel 7 and the role of the top rail for the adjacent panel 7'' located below the said piece 39. For this purpose it comprises a reinforcing rib 40 analogous with the rib 31, a flange 41 analogous with the flange 25 and attached to the support wall 1, the said fixation being achieved, for example, by means of complete fixing elements 8, 9, a thinner part 42 analogous with the part 34 with its vent holes 35 and condensed water evacuating holes 36, with the exception of the holes 37, and its ratchet blade 15, a top edge 43 analogous with the edge 33, and supported on the panel 7, and a flange 44 analogous with the flange 26 with its vent holes 28. Moreover, a drip plate 46 forming one piece with the rib 40 and intended to serve as an evacuating guide for the condensed water toward the holes 28, is provided in a space 45 analogous with the space 29 and defined by the upper flange of the panel 7'' and the flange 44.

As is shown in FIG. 4, frame angles 48 made of thermoplastic material, such as polyvinyl chloride, and composed of sections in the form of male 49 and female parts 50, are used for the cable edges on the facade and/or around openings 47. The male part 49 comprises a pine cone-shaped end 51 which permits the junction and locking of the said male part in the female part 50, and which is provided with an appropriate recess 52 for receiving the said pine cone-shaped end 51. Such frame angles also comprise a cutout and a water catch boss which makes it possible to use them as lintels.

When the support wall to be heat insulated from the outside comprises a salient or re-entrant angle such as 53, as shown in FIG. 5, the junction pieces 54 are used. Each junction piece 54 is formed by two parts, one male 55 and one female 56, having the form of sections made of thermoplastic material, particularly polyvinyl chloride. The male part 55 comprises two flanges 57 and 58 located in perpendicular directions, and in the axis of symmetry 59 of the male part 55 there is located a pine cone-shaped end 60 locked by being sunk into an appropriate recess 61 provided in the female part 56, the latter comprising also two perpendicular flanges, 62 and 63, fixed to the support wall by means of appropriate fixing elements, particularly by the complete fixing elements 8, 9. in the case of a salient angle 53, the axis of symmetry 59 coincides with the internal bisectrix of the angle 53, and the female part 56 is fixed to the support wall, the male part 55 being supported on the adjacent panels of the cladding. In the case of a re-entrant angle one proceeds in the opposite sense, i.e., the male part 55 is attached to the support wall, whereas the female part 56 is supported on the adjacent panels.

Reference was made above consistently to the panels 7, 7' and 7'' without specifying the surface finish of their outer face. Due to their function and their position, the panels do contribute to the aesthetics of the buildings protected by the claddings described based on the FIGS. 1 through 5. The current tendency is to confer a variable and pleasant outside appearance to the panels.

To prepare a panel with an embossed appearance, and particularly a conventional painted appearance, the present invention also relates to an apparatus for embossing the panels (FIG. 6).

At the outlet of the extruder, not shown, the panel is in a softened state in the form of a continuous web 66 and has a temperature on the order of magnitude of 150° C. at a certain distance. The web passes into a first shaper consisting of two parts, 64 and 65, which are disposed beside the lateral parts of the web 66, the said lateral parts forming, in fact the future flanges of the panels, after the web 66 has been cut. The distance between the parts 64 and 65 of the shaper is adjustable in such a way as to permit a possible modification of the flanges of the panel. The parts 64 and 65, or shaping elements, are connected each to a vacuum source or are connected together to a vacuum source 67, and are also provided with cooling means (not shown). Underneath the web 66 is disposed a smooth counter-roller 68, mounted loosely on its shaft, not shown, and having a diameter on the order of magnitude of 400 mm, whereas above the said web 66 is mounted an embossing roller 69 which is longer than the counter-roller 68, and which has a diameter of ca. 280 mm and contains roughnesses which are able to produce local deformations which confer an embossed appearance to the web 66 and consequently also the panel obtained from the said web when the roller 69 is driven by means not shown. The linear speed of the roller 69 is equal to the speed of travel of the web 66 in the direction indicated by an arrow 71, the said travel being controlled electronically. The shaping elements 64 and 65 ensure a certain cooling of the lateral borders of the web 66 and due to the vacuum they generate, they emboss the outer surface of the said lateral borders on their faces opposite these lateral borders, which prevent the rolling of the web 66 on the embossing roller during the embossing.

At the outlet of the first shaper, formed by the shaping elements 64 and 65, the web 66 has consequently been subjected to a preliminary cooling, which is more considerable on the lateral flanges or lateral borders than on the central part 72 passing through between the rollers 68 and 69. For example, the central part 72 of the web 66 has a temperature on the order of magnitude of 80° C. at the outlet of the embossing unit comprising the first shaper formed by the shaping elements 64 and 65, the embossing roller 69 and the smooth counter-roller 68.

Beyond the embossing unit comprising the means 64 through 70 as indicated above, the apparatus also comprises secondary cooling and shaping means, the said shaping and cooling means being mounted on the same support frame 73 as the embossing unit.

The secondary shaping means comprise a base 74 provided with lateral borders 75 on which are mounted the shaping elements 76 and 77 which are analogous with the shaping elements 64 and 65. The base 74 has a section similar to that of the web 66, the central part 72 of the web 66 moving on the upper face 78 of the base 74 which comprises, at its top end, the suction slots 79, numbering, e.g., three in the outline shown in FIG. 6. Above the shaping elements 76 and 77, which are connected to a vacuum source (not shown) via the pipes 80, is disposed a plate 81 serving as a cover for the base 74. Suction slots 82 are also provided in the cover 81, the said slots being provided in a number equal to that of the slots 79. The said slots 82 and 79 are connected to a suction pump (not shown) via one or several pipes 83.

A tank 84 filled with a cooling liquid such as water 85 is disposed behind the shaping elements 76 and 77. The web 66, already cooled laterally by the shaping elements 76 and 77, arrives in the said tank 84 in its final shape. The tank 84 comprises the water feed lines 86 and an overflow pipe 87. Thanks to the slots 79 and 82 a small amount of water is sucked from the tank 84 in a direction opposite to the direction 71 of movement of the web 66. The moving water film formed on both sides of the said web 66 and which is evacuated via the slots 79 and 82 not only brings about additional cooling, but especially prevents the embossed web from dulling.

Finally, a standard shaper 88, connected to a vacuum source 89, completes the shaping, the cooling and the drying of the web 66 which leaves the apparatus at ambient temperature and in its definiive shape, ready to be cut into separate elements each of which forms a panel for the above-described cladding.

The present invention is, of course, not limited to the embodiments described above, but covers all the variants as well.

We claim:

1. A cladding element for providing a wall with an outer facade, comprising a central band having flanges extending from opposite edges thereof, wherein each of said flanges extends from said central band on the same side of the plane of said central band, and wherein each of said flanges includes a row of venting holes and connection means comprises of a single ratchet blade protruding outwardly from the flange and adapted for interlocking connection with the single ratchet blade of a corresponding, adjacent cladding element to be connected to said cladding element.

2. The cladding element of claim 1 wherein the ratchet blade extends from central portions of the flange of the cladding element, so that adjacent cladding elements to be joined are interconnected in juxtaposed, co-planar alignment.

3. The cladding element of claim 1 wherein the outer surface of the central band is embossed.

4. The cladding element of claim 1 which further comprises at least one frame angle including a male section having a pine-cone shaped end and a female section having a recess for said male section.

5. The cladding element of claim 1 which further comprises at least one junction piece for re-entrant or salient angles, said junction piece including a male section having two perpendicular flanges and a pine-cone shaped end provided along the internal bisectrix of the right angle enclosed by said flanges, and a female section having two perpendicular flanges and a recess for receiving the pine-cone shaped end provided in an outer body and whose axis is located on the external bisectrix of the right angle enclosed between the perpendicular flanges of the female section.

6. The cladding element of claim 1 wherein said rows of venting holes are spaced fully along said flanges.

7. The cladding element of claim 1 wherein said cladding element is extruded from a thermoplastic material.

8. The cladding element of claim 7 wherein said thermoplastic material is polyvinyl chloride.

9. The cladding element of claim 1 wherein a first of the flanges is additionally provided with a catch and a second of the flanges is additionally provided with a stop, so that when two adjacent cladding elements are connected with each other, the catch comes to rest on the stop.

10. The cladding element of claim 9 wherein the catch is part of a reinforcing rib having a row of holes for receiving means for fixing the cladding element on said facade.

11. The cladding element of claim 1 wherein a second flange of said cladding element is protected by a rail made of an extruded thermoplastic material and comprised of a central rib for covering the second flange of the cladding element, and two flanges extending from the central rib in opposite directions, wherein the first of said flanges is attachable to said outer facade, and the second of said flanges slightly projects over and is supported on the central band of the cladding element.

12. The cladding element of claim 11 wherein the second of said flanges includes at least one row of vent holes.

13. The cladding element of claim 1 wherein an intermediate piece is provided to serve as a rail for separating two adjacent cladding elements.

14. The cladding element of claim 13 wherein said intermediate piece includes a central rib which extends downwardly to define a drip plate for collecting and guiding condensed water.

15. The cladding element of claim 1 wherein said central band and depending flanges define a cavity for containing an insulating core made from a rigid insulation material and including a series of embossed blocks distributed evenly over the outer surface of the insulating core so that the inner surface of the central band rests on the embossed blocks of the insulating core.

16. The cladding element of claim 15 wherein said embossed blocks are disposed over the outer surface of said insulating core so that diagonals of said embossed blocks are substantially parallel to the longitudinal axis of said insulating core.

17. The cladding element of claim 16 wherein said embossed blocks are square with rounded borders.

18. The cladding element of claim 15 wherein said embossed blocks are separated to define vent channels in said insulating core.

19. The cladding element of claim 18 wherein said vent channels communicate with the vent holes of the cladding element.

20. The cladding element of claim 1 wherein a first flange of said cladding element is protected by a rail made of an extruded thermoplastic material and comprised of a central reinforcing rib and two flanges extending from the central reinforcing rib in the same direction, wherein the first of said flanges is attachable to said outer facade, and the second of said flanges is slightly elastic and is supported at its free end on the central band of the cladding element.

21. The cladding element of claim 20 wherein a ratchet blade extends from said central rib to cooperate with the ratchet blade of the cladding element.

22. The cladding element of claim 21 wherein vent holes and weep holes for condensed water are provided in the central rib opposite the corresponding holes of said cladding element.

23. The cladding element of claim 21 wherein the central rib includes a catch for engaging a stop associated with the cladding element.

24. The cladding element of claim 1 wherein two rows of holes are provided on a first of the flanges, and wherein the ratchet blade provided on said first flange is disposed between the two rows of holes.

25. The cladding element of claim 24 wherein a second of the flanges has only one row of holes, and wherein the ratchet blade provided on said second flange is configured to complement the ratchet blade provided on said first flange, and is disposed between said one row of holes and the central band of the cladding element.

26. The cladding element of claim 25 wherein the holes of each row of holes are oblong, and wherein the holes of the rows of holes which are separated from the central band of the cladding element by the ratchet blades vent the space defined between the cladding element and the wall.

27. The cladding element of claim 26 wherein the holes of the row of holes located between the ratchet blade and the central band of the cladding element drain condensation products formed in the space defined between the cladding element and the wall.

28. The cladding element of claim 27 wherein the dimensions of the vent holes of said two flanges are the same, and different from the dimensions of the drain holes.

29. The cladding element of claim 27 wherein the vent holes of the first flange of a first cladding element are in general alignment with the vent holes of the second flange of a second cladding element connected adjacent to the first cladding element.

30. The cladding element of claim 27 wherein the drain holes of a first cladding element are in general alignment with the ratchet blade of a second cladding element connected adjacent to the first cladding element.

31. The cladding element of claim 27 wherein the drain holes are located between the ratchet blade and a tongue depending from said first flange for a distance such that when two adjacent cladding elements are connected with each other, a passage is developed between the end of said tongue and the second flange of the adjacent cladding element.

32. A cladding element for providing a wall with an outer facade, comprising a central band and flanges extending from opposite edges of the central band to define a cavity for containing an insulating core made from a rigid insulation material and including a series of embossed blocks distributed evenly over the outer surface of the insulating core so that the inner surface of the central band rests on the embossed blocks of the insulating core and so that diagonals of said embossed blocks are substantially parallel to the longitudinal axis of said insulating core.

33. The cladding element of claim 32 wherein said embossed blocks are square with rounded borders.

34. The cladding element of claim 32 wherein said embossed blocks are separated to define vent channels in said insulating core.

35. The cladding element of claim 34 wherein said vent channels communicate with the vent holes of the cladding element.

* * * * *